United States Patent
Tanaka et al.

(12) 
(10) Patent No.: US 6,335,914 B2
(45) Date of Patent: Jan. 1, 2002

(54) OPTICAL DISC DEVICE

(75) Inventors: Toru Tanaka, Kobe; Yuji Ariyoshi, Toyonaka; Masanao Wakikawa, Sakai; Kiyoshi Ishioka; Masanori Onishi, both of Hirakata, all of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/334,770

(22) Filed: Jun. 16, 1999

(30) Foreign Application Priority Data

Jun. 17, 1998 (JP) .................................................. 10-169061

(51) Int. Cl.⁷ .................................................. G11B 33/02
(52) U.S. Cl. .......................................................... 369/77.1
(58) Field of Search .................................. 369/77.1, 75.2

(56) References Cited

U.S. PATENT DOCUMENTS

| | | | | |
|---|---|---|---|---|
| 3,773,331 A | * | 11/1973 | Watanabe | 369/67 |
| 4,686,665 A | * | 8/1987 | Kamoshita | 369/77.2 |
| 5,636,198 A | * | 6/1997 | Maeng | 369/191 |
| 5,742,571 A | * | 4/1998 | Hoshino et al. | 369/37 |
| 6,091,695 A | * | 7/2000 | Takigawa et al. | 369/178 |

* cited by examiner

Primary Examiner—Robert S. Tupper
Assistant Examiner—Julie Anne Watko
(74) Attorney, Agent, or Firm—Parkhurst & Wendel, L.L.P.

(57) ABSTRACT

An optical disc device, having a traverse base includes an optical pickup and a feed motor that drives the optical pickup forward and backward from an inner circumferential position of an optical disc to an outer circumferential position thereof. This device comprises a loading device for transferring an optical disc from the exterior of the device body onto the traverse base, and a loading driving device for driving the loading device by using the driving of the feed motor. The feed motor can move the optical pickup for signal reproduction and eject the optical disc to the exterior of the device, thereby reducing the number of motors used in the device to provide a more inexpensive optical disc device.

4 Claims, 11 Drawing Sheets

OPTICAL DISC DEVICE

FIELD OF THE INVENTION

The present invention relates to an optical disc device for recording a signal on an optical disc such as a compact disc or reproducing a recorded signal therefrom, and in particular, to an optical-pickup driving mechanism and an optical-disc loading mechanism.

BACKGROUND OF THE INVENTION

A conventional optical disc device normally allows an optical disc to be installed on a disc tray that slides out from an opening in the front panel of the device according to a user's operation, and then withdraws the disc tray with the optical disc to a predetermined position inside the device. Then, the optical disc, which has reached the predetermined position inside the device, is sandwiched between a turn table and a clamper and then rotated at a predetermined rotation speed. An optical pickup reproduces a signal recorded within a predetermined range on the optical disc by moving in response to the track position of the signal.

In the conventional optical disc device, different motors are used as driving sources for driving these operations, that is, the three operations including the disc loading, disc rotating, and optical-pickup feeding operations. That is, the conventional optical disc device is normally configured so as to use three motors in total.

In the conventional optical disc device, however, the motors were among the most expensive parts and there was a problem that the use of the three motors prevented the price of the entire device from being reduced.

SUMMARY OF THE INVENTION

The present invention solves this problem, and its object is to reduce the number of motors used in the device in order to provide a more inexpensive optical disc device.

To attain this object, an optical disc device comprises a traverse base including an optical pickup and a feed motor that drives the optical pickup forward and backward from the inner circumferential position of the optical disc to the outer circumferential position thereof, and comprises a loading means for transferring the optical disc from the exterior of the device body onto a traverse base and a loading driving means for driving the loading means using the feed motor that is also used for driving the optical pickup.

In this configuration, the feed motor can move the optical pickup to reproduce a signal and eject the optical disc to the exterior of the device, thereby reducing the number of motors used in the device in order to provide a more inexpensive optical disc device.

The invention is an optical disc device characterized in that a traverse base is disposed on a device body and includes an optical pickup that records a signal on an optical disc or that reproduces a signal recorded thereon and a feed motor that drives via an optical-pickup driving means, the optical pickup forward and backward from the inner circumferential position of the optical disc to the outer circumferential position thereof, and in that the device body comprises a loading means for transferring the optical disc from the exterior of the device body onto the traverse base and a loading driving means for driving the loading means using the feed motor that is also used for driving the optical pickup. This optical disc device uses the feed motor to move the optical pickup and also to drive the loading means, thereby enabling the optical disc to be ejected to the exterior of the device, and eliminates the needs for an optical-disc loading motor that has been required in the conventional optical disc device.

According to an object of the invention the optical pickup can move up to an extended switching position that is closer to the center of the optical disc than a signal position range on the optical disc in which signals are recorded is, and in that when the pickup is at the extended switching position, the rotational driving force of the feed motor is switched and transmitted to the loading driving means. This optical disc device uses the feed motor to move the optical pickup to the signal inner-circumferential-end switching position on the optical disc and further continues rotating the feed motor in the same direction, thereby enabling the loading driving means to automatically eject the optical disc to the exterior of the device.

According to a further object of the invention an inner-circumference detecting is provided for detecting that the optical pickup has moved to the inner-circumferential-end switching position within the signal position range due to the rotational driving force of the feed motor; and a power transmission switching means is provided for rotationally driving the feed motor to further move the pickup toward the inner circumference of the optical disc when the inner circumferential detecting switch executes detection, thereby switching the driving force of the feed motor to the loading driving means, whereby the rotating direction of the feed motor is switched according to a detection signal from the inner-circumference detecting switch in order to selectively switch the transmission of the rotational driving force of the feed motor between the driving of the loading means and the driving of the optical pickup. This optical disc device detects that the optical pickup is at the inner-circumferential-end switching position or has moved thereto while the inner-circumference detecting switch is being turned off, and allows the optical pickup to further move toward the inner circumference of the optical disc even after it has turned on the inner-circumference detecting switch.

According to yet another objection of the invention, the traverse base includes a turn table on which the optical disc is placed, said traverse base being mounted to be able to swing around its rear end, and wherein the device further comprises an elevating means for swinging the traverse base to elevate and lower the turn table relative to the optical disc and a power transmission means for transmitting the driving force of the feed motor to the elevating means in response to an optical-disc transfer operation performed by the loading means, whereby the turn table is elevated and lowered in response to the optical-disc transfer operation in order that the optical disc can be installed on and removed from the turn table. After the elevating means has elevated the traverse base, the turn table or the like can clamp the optical disc almost in the horizontal direction. After the traverse base has been lowered by using the driving force of the feed motor via the power transmission means to activate the elevating means, the turn table can be moved downward while being inclined to unclamp the optical disc so that the optical disc can pass over the turn table when it is installed from the exterior of the device and when it is removed from the interior.

The loading driving means includes driving gears that transmit the rotational driving force of the feed motor and a rack that is provided in part of the loading means and meshes with the driving gear, the rack teeth of the rack having a tooth trace angle almost the same as the rotational-movement angle of the traverse base. When the turn table, that is, the traverse base rotationally moves in such a way that its front is inclined downward, the driving gear is also inclined relative to the horizontal state. Since the rack teeth of the rack are configured to incline so as to have a tooth trace angle almost the same as the swing angle of the traverse base, the driving gear and the rack constantly mesh with each other correctly.

EMBODIMENTS

Figure 7:
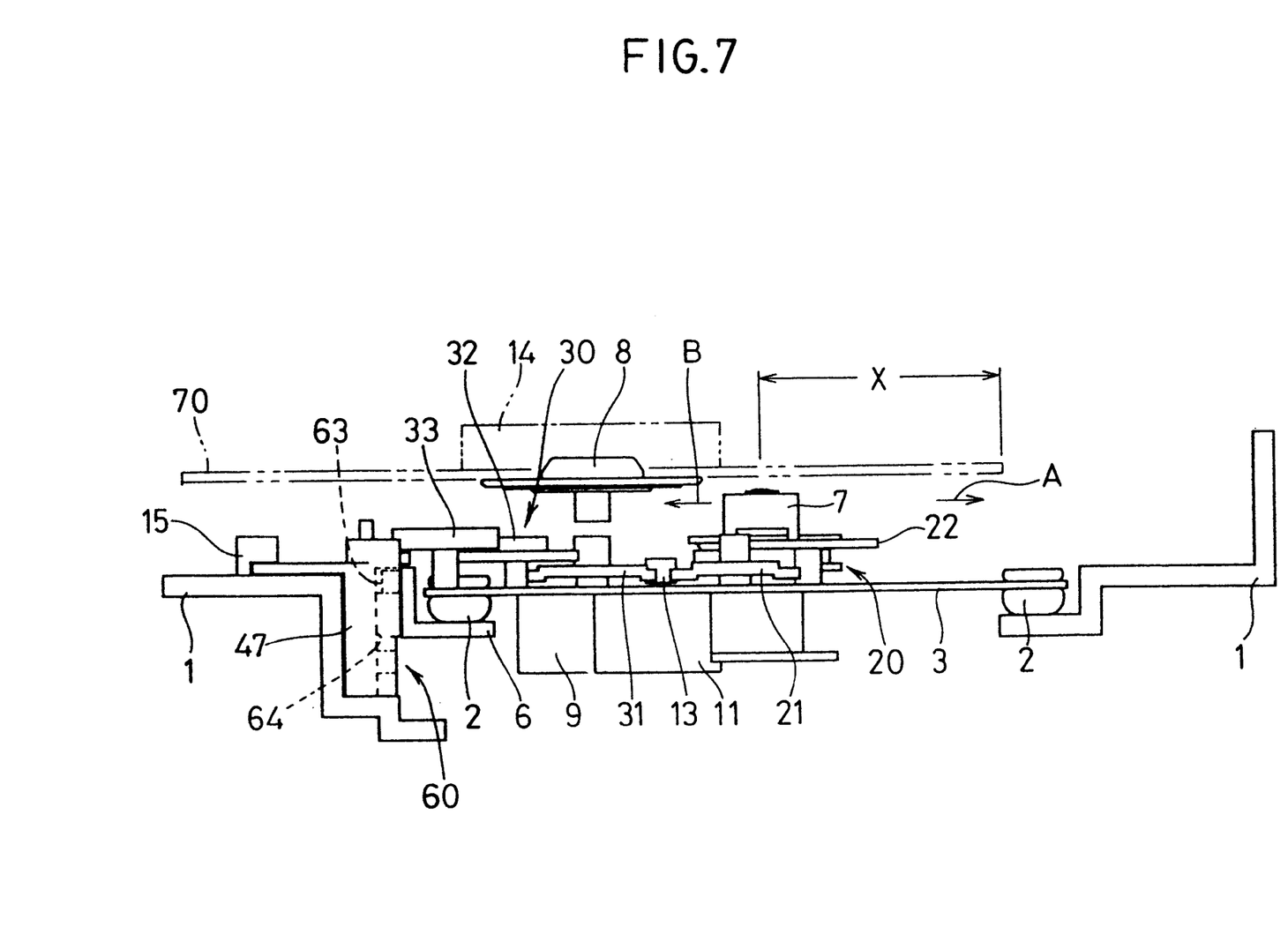
FIG. 7 is a side view showing the optical disc device according to the embodiment of this invention, in which a vertical slider is located at an upper position.
Figure 8:
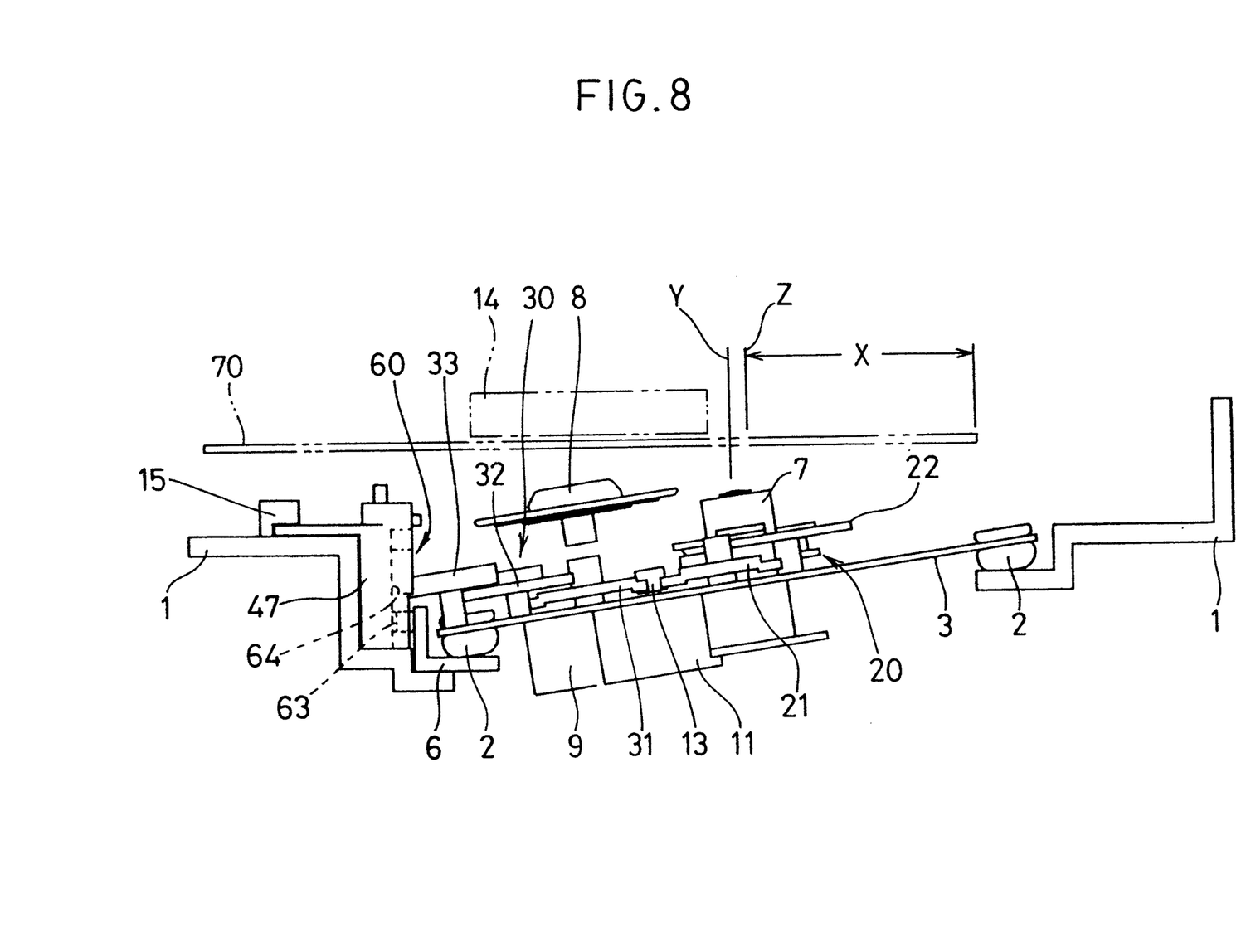
FIG. 8 is a side view showing the optical disc device according to the embodiment of this invention, in which the vertical slider is located at a lower position.
Figure 9:
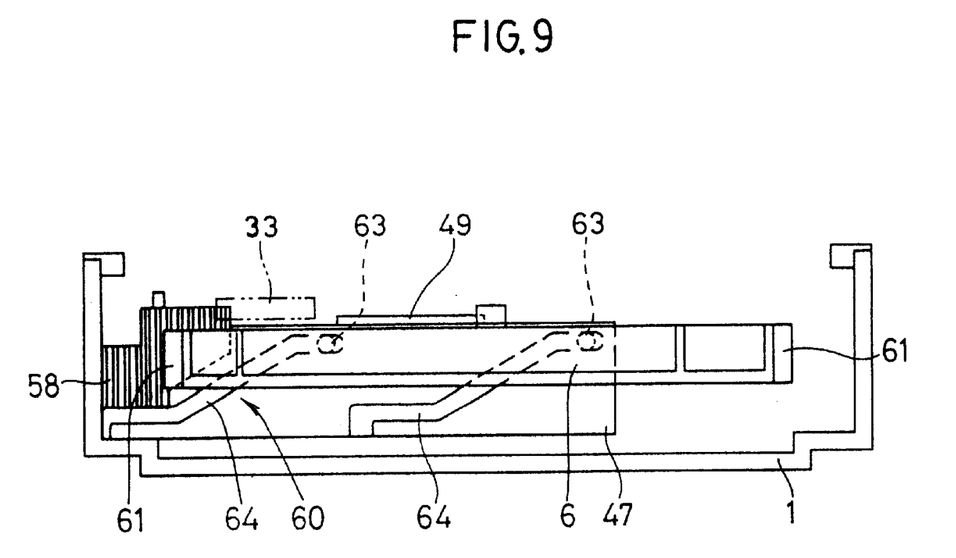
FIG. 9 is a rear view showing a cam rack body section of the optical disc device according to the embodiment of this invention, in which a vertical slider is located above.
Figure 10:
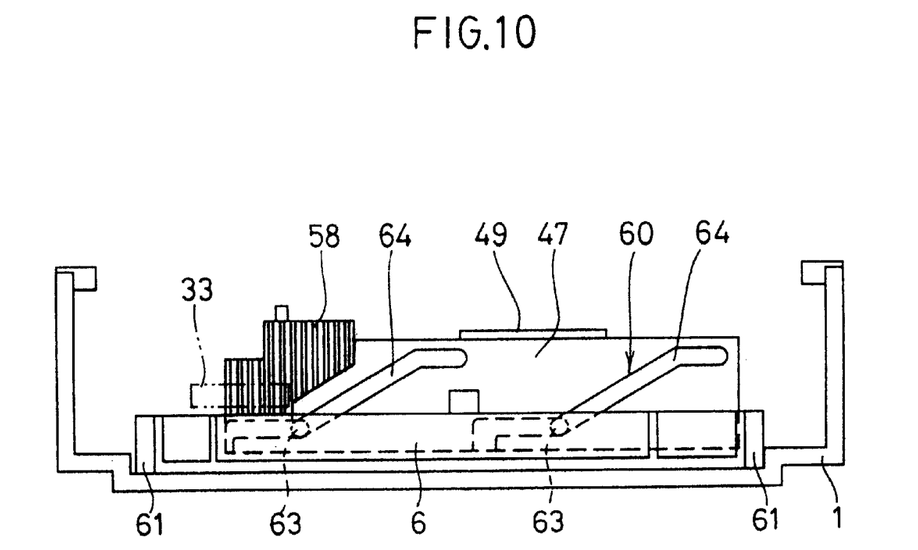
FIG. 10 is a rear view showing the cam rack body section of the optical disc device according to the embodiment of this invention, in which the vertical slider is located at a lower position.
Figure 11:
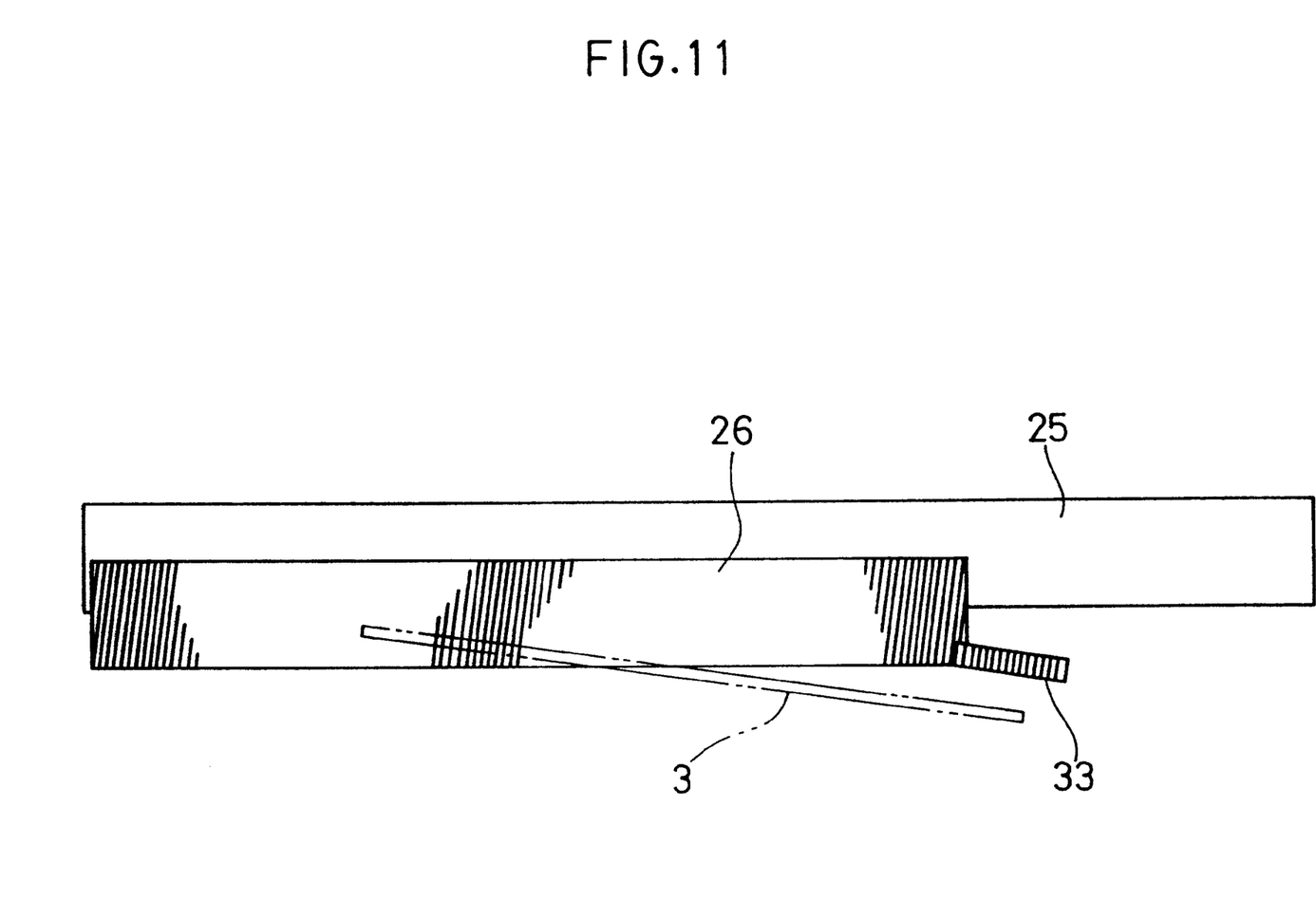
FIG. 11 is a side view showing a tray rack section of the optical disc device according to the embodiment of this invention, in which the vertical slider is located at a lower position.
Figure 12:
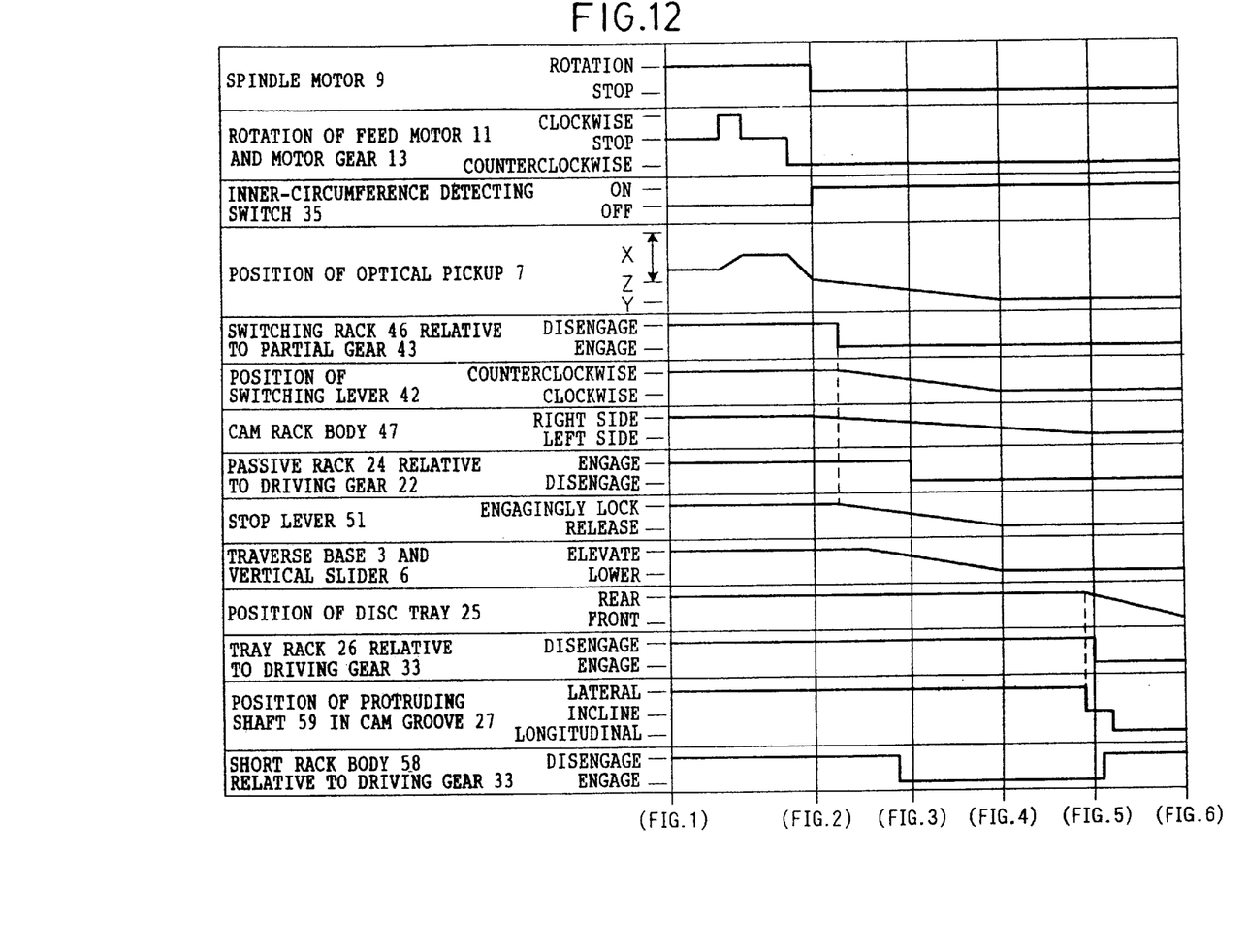
FIG. 12 is a timing chart of the optical disc device according to the embodiment of this invention.

An embodiment of an optical disc device according to this invention will be described below in detail with reference to the drawings. FIGS. 1 to 6 are plan views showing a configuration of the optical disc device according to the embodiment of this invention and its operations performed in the order of the drawing number. FIGS. 7 and 8 are side views of the optical disc device. FIGS. 9 and 10 are rear views of a cam rack body section of the optical disc device. FIG. 11 is a side view of a tray rack section of the optical disc device. FIG. 12 is a timing chart of the optical disc device.

In FIGS. 1 to 11, a traverse base 3 like a rectangular plate is disposed on a device body (mechanical base) 1 via four floating rubber pieces 2 placed in positions of the traverse base 3 corresponding to its corners. The traverse base 3 is mounted so as to swing toward the device body 1 using as fulcrums for the swinging-movement the two floating rubber pieces 2 disposed at the rear end of the traverse base 3. The front end of the traverse base 3 is mounted via the remaining two (a plurality of) floating rubber pieces 2 on a vertical slider 6 mounted on the device body 1 so as to move in the vertical direction. That is, the traverse base 3 is approximately adapted to swing around the rear end when the vertical slider 6 is moved in the vertical direction. The vertical-movement configuration of the vertical slider 6 will be described below.

The traverse base 3 includes an optical pickup 7 for recording a signal in an optical disc 70 or reproducing a recorded signal, a turn table 8 for cooperating with a damper 14 in sandwiching the rotating center of the loaded optical disc 70 to rotate the optical disc 70, a spindle motor 9 for turning the turn table 8, and a feed motor 11 acting as a driving source for driving the optical pickup 7 forward and backward approximately from an inner circumferential position on the optical disc 70 to an outer circumferential position thereon.

That is, the optical pickup 7 is positioned in such a way as to be embedded in a penetrating section 4 formed in the traverse base 3 and is supported and guided by guide bodies 5 provided at the right and left side edges of the penetrating section 4 so as to be driven forward and backward approximately from an inner circumferential position on the optical disc 70 to an outer circumferential position thereon. The turn table 8 is placed at the front of the penetrating section 4. The spindle motor 9 has a rotating shaft 10 coaxial with the turn table 8, and the feed motor 11 has a rotating shaft 12 coaxial with a motor gear 13.

The pickup driving means 20 comprises an optical-pickup driving gear train disposed on the traverse base 3, an optical pickup feed rack body 23 mounted on the optical pickup 7 and the like. The optical-pickup driving gear train comprises a first driving gear 21 that meshes with the motor gear 13 for speed reduction and a second driving gear 22 that meshes with the first driving gear 21 for speed reduction. A speed reduction gear section of the second driving gear 22 can mesh with a longitudinal passive rack 24 formed on the optical-pickup feeding rack body 23.

These components 21 to 24 form an example of the optical pickup driving means 20 for transmitting the driving force of the feed motor 11 to the optical pickup 7.

The device body 1 includes a loading means for transferring the optical disc 70 from the exterior of the device body 1 onto the traverse base 3 and a loading driving means 30 for driving the loading means using the feed motor 11. That is, an example of the loading means is composed of a disc tray 25 or the like and has a tray rack 26 and a cam groove 27 formed in its rear surface.

The loading driving means 30 is configured by a loading driving gear train placed on the traverse base 3 and a longitudinal tray rack 26 formed on the disc tray 25. The loading driving gear train comprises a third driving gear 31 that meshes with the motor gear 13 for speed reduction, a fourth driving gear 32 that meshes with the third driving gear 31 for speed reduction, and a fifth driving gear 33 that meshes with the fourth driving gear 32 for speed reduction. The tray rack 26 can mesh with a gear section of the fifth driving gear 33.

These components 26, 31 to 33 configure an example of the loading driving means 30 for transmitting the driving force of the feed motor 11 to the disc tray (loading means) 25.

The optical pickup 7 can move up to an extended switching position Y closer to the center of the optical disc 70 than a signal position range X of the optical disc 70 in which signals are recorded is, and switches and transmits the driving force of the feed motor 11 to the loading driving means 30 when the optical pickup 7 is at the extended switching position Y.

That is, the penetrating section 4 and the guide bodies 5 are formed so that the optical pickup 7 can move up to an extended switching position Y, and the length of the passive rack 24 is set over which it meshes with the motor gear 13. The traverse base 3 includes an inner-circumference detecting switch 35 for detecting that the optical pickup 7 has been moved to an inner-circumferential-end switching position Z of the signal position range X due to the rotational driving force of the feed motor 11. Furthermore, in response to the detection state of the inner-circumference detecting switch 35, the feed motor 11 is further driven to be rotationally moved toward the inner circumference of the optical disc.

In addition, in response to the device body 1, the traverse base 3, and the disc tray 25, a power transmission switching means 40 is provided that switches the driving force of the feed motor 11 to the loading driving means 30. Furthermore, by switching the rotating direction of the feed motor 11 in response to a detection signal from the inner circumference detecting switch 35, the transmission of the rotational driving force of the feed motor 11 is selectively switched between the driving of the disc tray (loading means) 25 and the driving of the optical pickup 7.

A switching lever 42 is rotatably provided in the front of the traverse base 3 via a vertical shaft 41, and a partial gear 43 and an elastic engaging-locking body 44 are provided at the base of the switching lever 42. A stopper body 45 is provided on the traverse base 3. Thus, when the switching lever 42 is turned toward the loading driving means 30 (counterclockwise), the elastic engaging-locking body 44 is engagingly locked on the stopper body 45 to restrict and maintain a position of the turning limit of the switching lever 42. When the switching lever 42 is at the position of the turning limit, a longitudinal switching rack 46 formed at the front end of the optical-pickup feeding rack body 23 can mesh with the partial gear 43.

A cam rack body 47 that can be supported and guided by a guide section 15 on the device body 1 to slide in the lateral direction is provided in front of the traverse base 3. An elastic engaging-locking body 48 that can be engagingly locked on a stopper body 16 provided on the device body 1 is formed at the left end of the cam rack body 47. A cam body 49 is provided on the cam rack body 47 so that the switching lever 42 turned clockwise can abut on the cam body 49.

A stop lever 51 is turnably disposed in the front of the device body 1 via a support shaft 50 that is located in a long lateral hole formed in the cam rack body 47. The stop lever 51 is L-shaped and the support shaft 50 is located in the corner thereof. The switching lever 42 turned clockwise can abut on the tip of the stop lever 51. In addition, a stopper pin 53 is provided at the proximal end of the stop lever 51.

An engaging locking recess 54 is formed at the left end of the cam rack body 47 and close to the elastic engaging body 48 so that the stopper pin 53 can be engagingly locked in the recess 54. An inclined cam surface 55 extending rightward from the engaging locking recess 54 and a lateral restricting surface 56 are formed on the front surface of the cam rack body 47. A spring 57 is provided for the support shaft 50 to urge and rotate the stop lever 51 so that the stopper pin 53 is abutted on the cam rack body 47. A short rack body 58 that can mesh with a fifth driving gear 33 in the loading driving means 30 is configured at the right end of the cam rack body 47 in the lateral direction.

These components 41 to 58 form an example of the power transmission switching means 40 for switching the driving force of the feed motor 11 to the loading driving means 30.

A protruding shaft 59 that engages with a cam groove 27 formed in the disc tray 25 is provided on the cam rack body 47. The cam groove 27 is formed of a lateral groove section 27a located in the front of the disc tray 25, an inclined groove section 27b that is inclined rearward from the inner end of the lateral groove section 27a, and a longitudinal groove section 27c extending rearward from the end of the inclined groove section 27b.

This device includes an elevating means 60 for swinging the traverse base 3 to elevate and lower the turn table 8 relative to the optical disc 70, and a power transmission means 66 for transmitting the driving force of the feed motor 11 to the elevating means 60 in response to the optical disc 70 transfer operation performed by the disc tray 25. Thus, the turn table 8 is elevated and lowered in response to the optical disc 70 transfer operation so that the optical disc 70 can be installed on and removed from the turn table 8.

That is, as described above, the traverse base 3 is mounted on the vertical slider 6 via the two floating rubber pieces 2 disposed at the front end of the traverse base 3, so as to be swung in response to the vertical operation of the vertical slider 6. At that time, the vertical slider 6 is vertically moved by fitting guided sections 61 provided on both right and left of the vertical slider 6, in a vertical guide section 62 provided on the device body 1 so as to guide the guided sections 61 through the guide section 62.

A lateral pair of cam pins 63 are provided on the front surface of the vertical slider 6, and a lateral pair of cam grooves 64 with which the cam pins 63 are engaged are formed in the rear surface of the cam rack body 47. At that time, the cam groove 64 is formed to move the vertical slider 6 in the vertical direction via the cam pin 63 in response to the lateral movement operation of the cam rack body 47.

These components 61 to 64 form an example of the elevating means 60 for swinging the traverse base 3 to elevate and lower the turn table 8 relative to the optical disc 70.

In addition, the rack teeth of the short rack body 58 are set to have a sufficient vertical length to maintain the fifth driving gear 33 meshing with the short rack body 58 even if the traverse base 3 swings in the vertical direction in response to the lateral movement of the cam rack body 47.

These components 58 and 33 form an example of the power transmission means 66 for transmitting the driving force of the feed motor 11 to the elevating means 60 in response to the optical disc 70 transfer operation performed by the disc tray 25.

The rack teeth of the tray rack 26 are approximately formed to have a tooth trace angle almost the same as the swing angle of the traverse base 3 s o that even when the traverse base 3 is swung as described above, the rotational driving force of the feed motor 11 can be smoothly transmitted from the fifth driving gear 33 of the loading driving means 30 to the tray rack 26.

Operations of the embodiment of the optical disc device configured as described above will be described with reference to the timing chart in FIG. 12.

Figure 1:
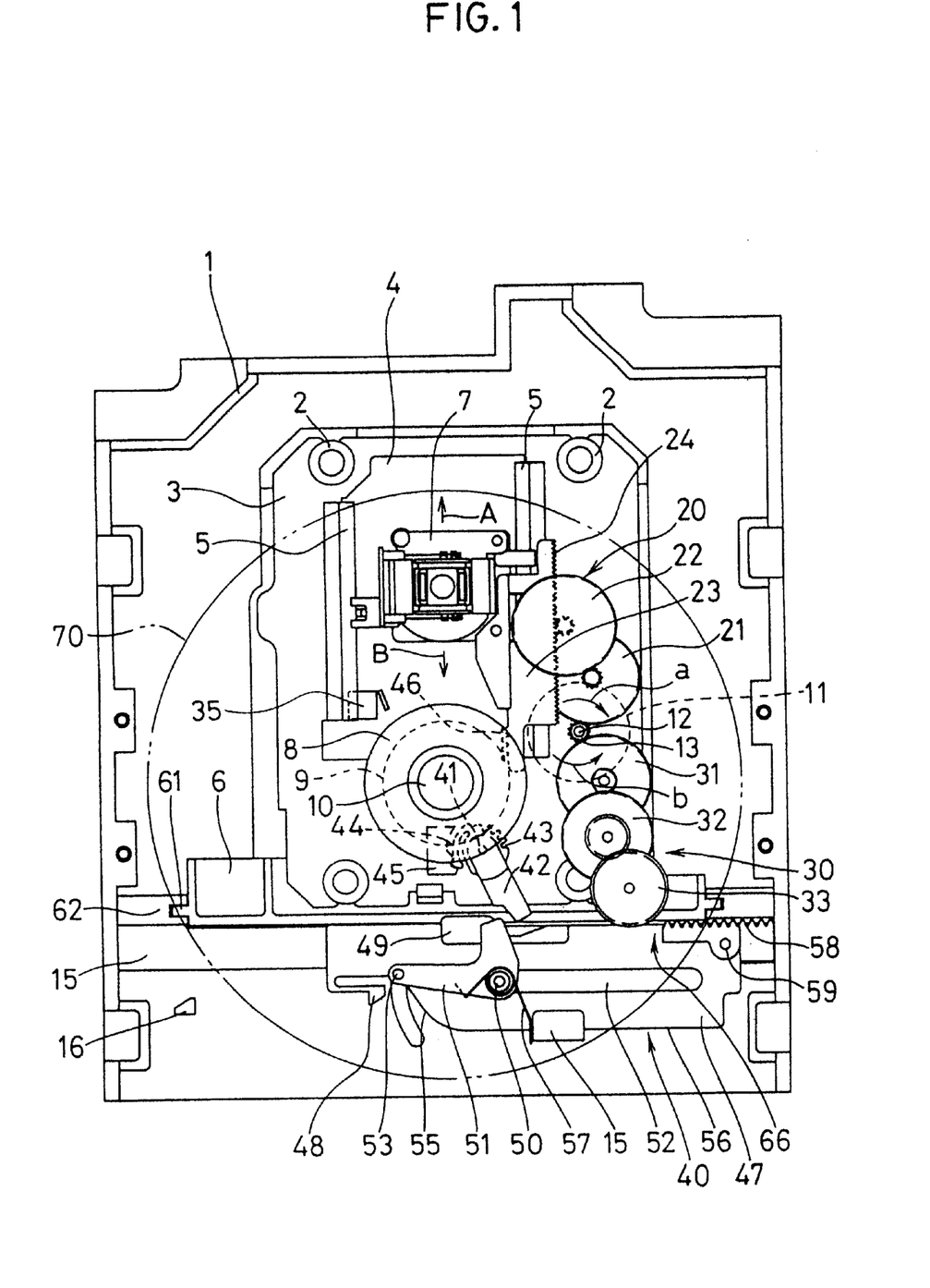
FIG. 1 is a plan view showing an optical disc device according to an embodiment of this invention, which is reproducing a signal from an optical disc.

First, FIGS. 1, 7, and 9 show the optical disc device, which is reproducing a signal from the optical disc 70.

In this case, in the power transmission switching means 40, the switching lever 42 has been turned counterclockwise to engagingly lock the elastic engaging locking body 44 on the stopper body 45, and the cam rack body 47 has been moved up to the right limit to remove the short rack body 58 from the right end of the fifth driving gear 33 while engagingly locking the stopper pin 53 in the engaging locking recess 54 in order to position the cam rack body 47. In addition, in the elevating means 60, the cam rack body 47 has been moved rightward to swing the vertical slider 6 upward.

Then, a signal is reproduced from the optical disc 70 by using the spindle motor 9 to rotate the optical disc 70 sandwiched on the turn table 8, at a predetermined rotation speed together with the turn table 8 while moving the optical pickup 7 to a location approximately under a target signal track to be reproduced, and then reading the signal on the optical disc 70 using an optical element such as a lens or a laser that is provided in the optical pickup 7.

Now, when the signal track to be reproduced is not located over the current position of the pickup 7 or a signal is to be reproduced from across several tens or more of signal tracks, the optical pickup 7 must be moved toward the outer circumference of the optical disc (shown by arrow A) or the inner circumference of the optical disc (shown by arrow B) along guide sections 5, 5 formed on the traverse base 3.

The optical pickup 7 is moved via the optical pickup driving means 20 by using the rotational driving force of the feed motor 11. That is, the rotation of the motor gear 13 provided by the feed motor 11 is transmitted from the first driving gear 21 to the second driving gear 22, which then rotates to drive the passive rack 24 in front and in rear. In this case, when the feed motor 11 rotates the motor gear 13 in the clockwise direction (a), the optical pickup 7 moves toward the outer circumference A, whereas when the feed motor 11 rotates the motor gear 13 in the counterclockwise direction (b), the optical pickup 7 moves toward the inner circumference B.

While a signal is being reproduced from the optical disc 70 as shown in FIG. 1, each driving gear 31, 32, 33 of the loading driving means 30 rotates in response to the rotation of the motor gear 13. Since, however, the short rack body 57 has been removed from the right end of the fifth driving gear 33 as described above, the driving force of the loading driving means 30 is not being transmitted to the disc tray 25.

Figure 2:
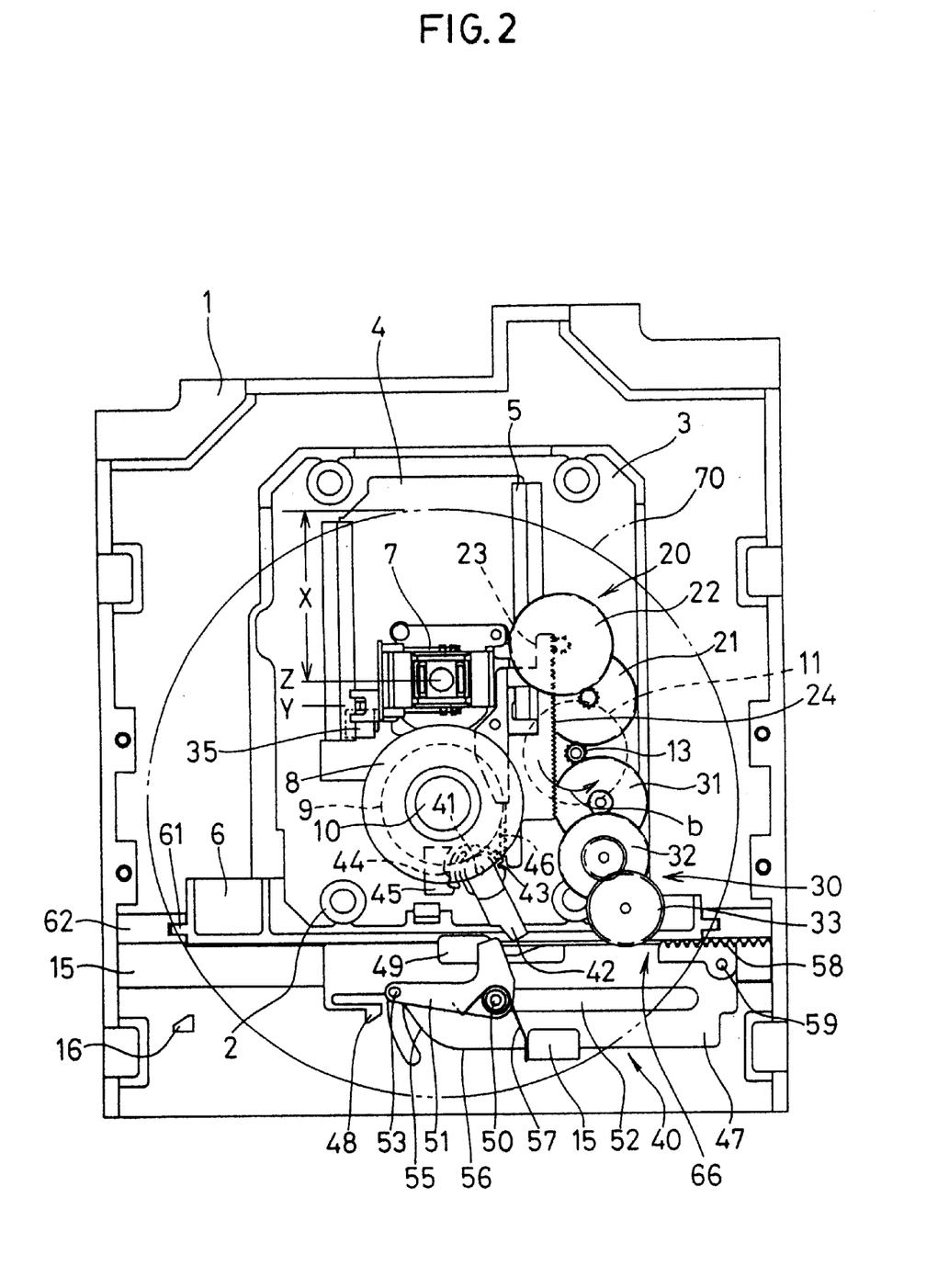
FIG. 2 is a plan view showing the optical disc device according to the embodiment of this invention, which is reproducing a signal recorded on the inner-most circumferential position.

Next, FIG. 2 shows the optical disc device, which is reproducing a signal recorded on the inner-most-circumferential position of the optical disc 70.

That is, the feed motor 11 has rotated the motor gear 13 in the counterclockwise direction (b), and the optical pickup 7 has been driven toward the inner circumference B by the optical-pickup driving means 20 to reach the inner-circumferential-end switching position Z of the recording position range X of the optical disc 70 in which signals are recorded. Thus, the rear end of the passive rack 24 is meshing with the second driving gear 22, and the switching rack 46 is situated close to the partial gear 43.

As shown in this figure, the standards for the optical disc 70 typically specify the signal position range X of the optical disc 70 in which signals are recorded, in terms of a radius from the center of the disc. In the conventional optical disc device, a position detecting switch for the optical pickup 7 is provided at the inner-most-circumferential position of the signal position range X to detect that the optical pickup 7 is at this position or has moved to it in order to prevent the optical pickup 7 from further moving toward the inner circumference.

On the contrary, in the optical disc device according to this invention, the inner-most-circumferential position is defined as the inner-circumferential-end switching position Z, at which an inner-circumference detecting switch 35 is provided. This optical disc device is similar to the conventional optical disc device in that it detects that the optical pickup 7 is at the inner-most-circumferential position or has moved thereto while the inner-circumference detecting switch 35 is being turned off, but differs from the conventional device in that the optical pickup 7 is configured to further move toward the inner circumference even after it has turned on the inner-circumference detecting switch 35.

Figure 3:
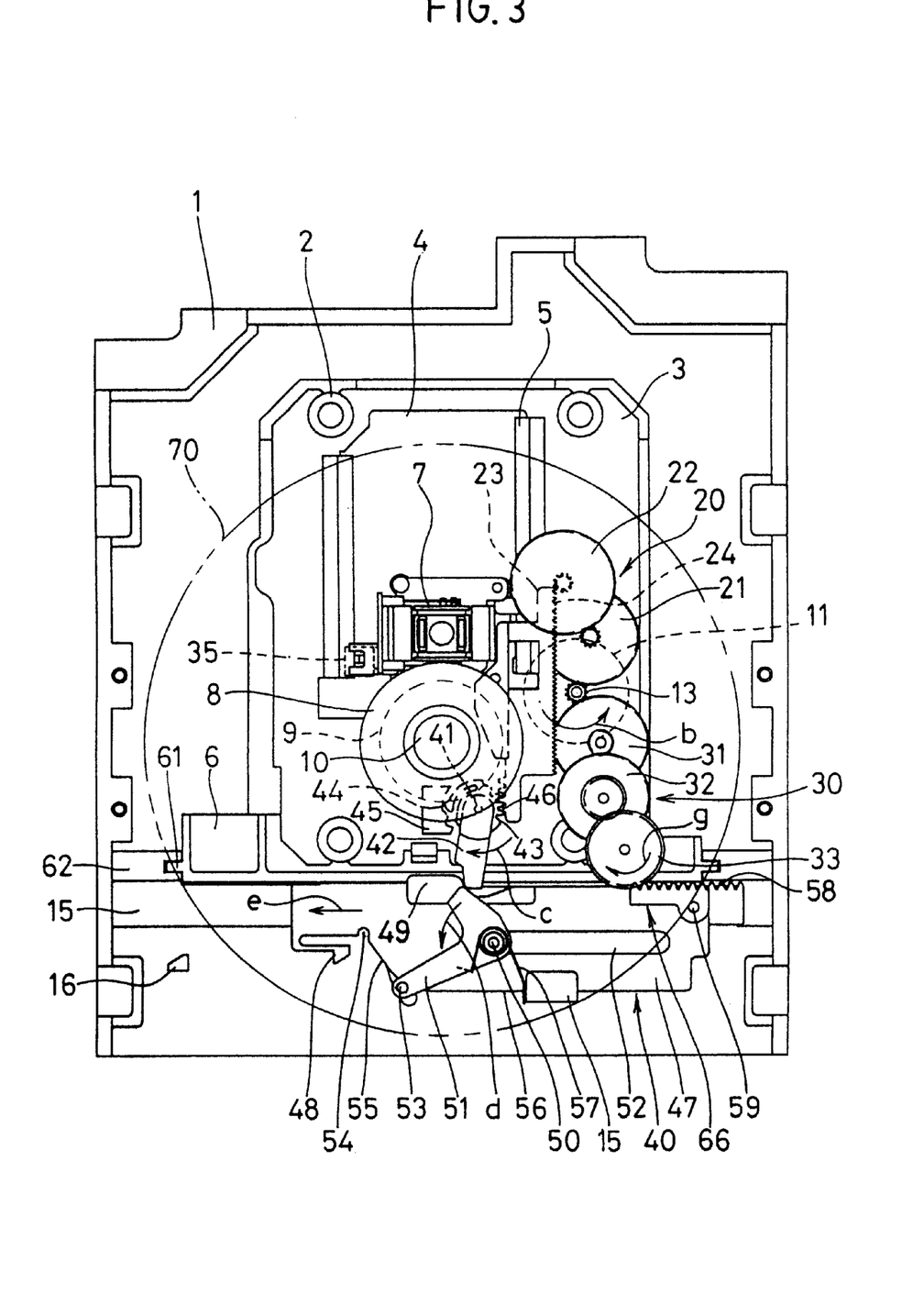
FIG. 3 is a plan view showing the optical disc device according to the embodiment of this invention, in which an optical pickup has been moved toward the inner circumference of the optical disc.

FIG. 3 shows the optical disc device, in which the optical pickup 7 shown in FIG. 2 has further moved toward the inner circumference relative to the inner-most -circumferential position of the optical disc 70 at which the optical pickup 7 has activated the inner-circumference detecting switch 35 as shown in FIG. 2.

The differences between the states of FIGS. 2 and 3 and the transitional operations between the states of FIGS. 2 and 3 will be described.

The optical pickup 7 is moved from the position in FIG. 2 to the position in FIG. 3 by using the feed motor 11 to rotate the motor gear 13 in the same rotating direction, that is, the counterclockwise direction (b) after the state of FIG. 2 in which the inner-circumference detecting switch 35, which is turned on, has been operated by the optical pickup 7.

Then, the optical pickup 7 further moves toward the inner circumference to allow a switching rack 46 mounted on the optical pickup 7 to turn the switching lever 42 in the clockwise direction (c) while engaging with the partial gear 43 of the switching lever 42. Then, the switching lever 42 further turns the stop lever 51 in the counterclockwise direction (d), while sliding the cam rack body 47 leftward via the cam body 49.

In this case, when the cam rack body 47 moves leftward, the short rack body 58 starts to mesh with the fifth driving gear 33, whereas the passive rack 24 maintains engagement with the second driving gear 22.

Figure 4:
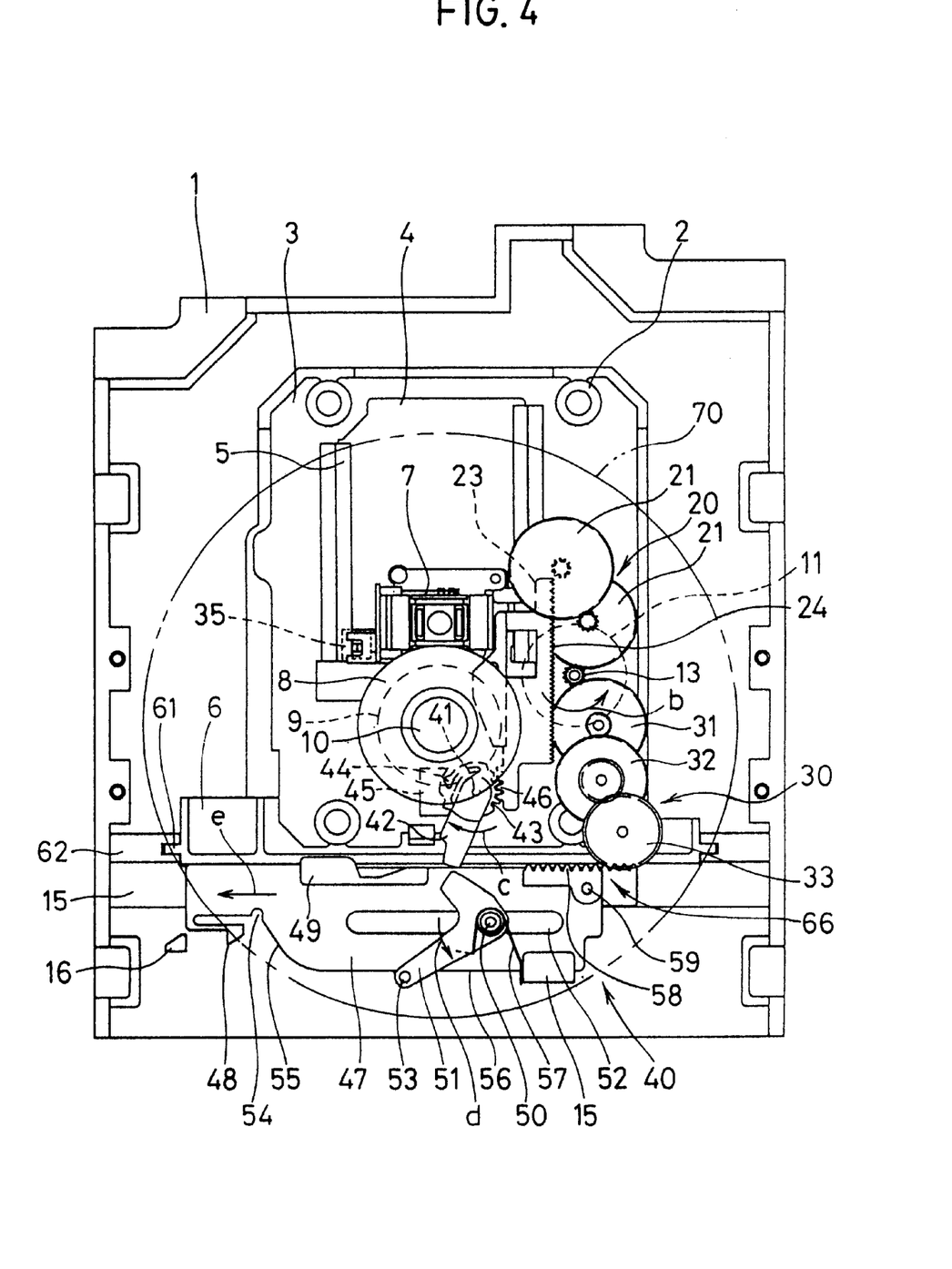
FIG. 4 is a plan view showing the optical disc device according to the embodiment of this invention, in which a cam rack has been moved to the left of the drawing.

FIG. 4 shows that the driving force of the fifth driving gear 33 has moved the cam rack body 47 leftward relative to the state in which the short rack body 58 starts to mesh with the fifth driving gear 33 as shown in FIG. 3. This operation is also performed by using the feed motor 11 to rotate the motor gear 13 in the counterclockwise direction (b) as in the feeding of the optical pickup 7 toward the inner circumference.

This operation of the cam rack body 47 turns the switching lever 42 in the clockwise direction (c) until it is restricted by the cam rack body 47, and further withdraws the optical pickup 7 toward the inner circumference until the passive rack 24 is disengaged from the second driving gear 22.

This operation of the cam rack body 47 also guides the stopper pin 53 from the inclined cam surface 55 to the restricting surface 56 to turn the stop lever 51 in the counterclockwise direction (d) until the stop lever 51 is completely separated from the switching lever 42.

In this optical disc device, the traverse base 3 is adapted to swing using its rear end as a fulcrum for swinging in response to the vertical movement of the vertical slider 6, and the cam pins 63 on the vertical slider 6 engage with the cam grooves 64 formed in the cam rack body 47. Thus, the vertical slider 6 moves in the vertical direction in response to the lateral movement of the cam rack body 47. That is, the lateral movement of the cam rack body 47 swings the traverse base 3 with its rear end as the fulcrum.

That is, in this optical disc device, when the cam rack body 47 is on the right side as shown in FIG. 3, the cam pin 63 engages with the upper part of the cam groove 64, so the vertical slider 6 is located at an upper position, as shown in FIGS. 7 and 9. In addition, when the cam rack body 47 is on the left side as shown in FIG. 4, the cam pin 63 engages with the lower part of the cam groove 64, so the vertical slider 6 is located at a lower position, as shown in FIGS. 8 and 10.

When the vertical slider 6 is located at the upper position as shown in FIG. 7, the optical disc 70 can be clamped by the turn table 8 and the damper 14 so as to lie almost in the horizontal direction. In addition, when the vertical slider 6 is located at the lower position as shown in FIG. 8, the turn table 8 has moved downward while inclining so that the optical disc 70 can pass over the turn table 8 when it is installed from the exterior of the device or when it is removed from the interior.

Figure 5:
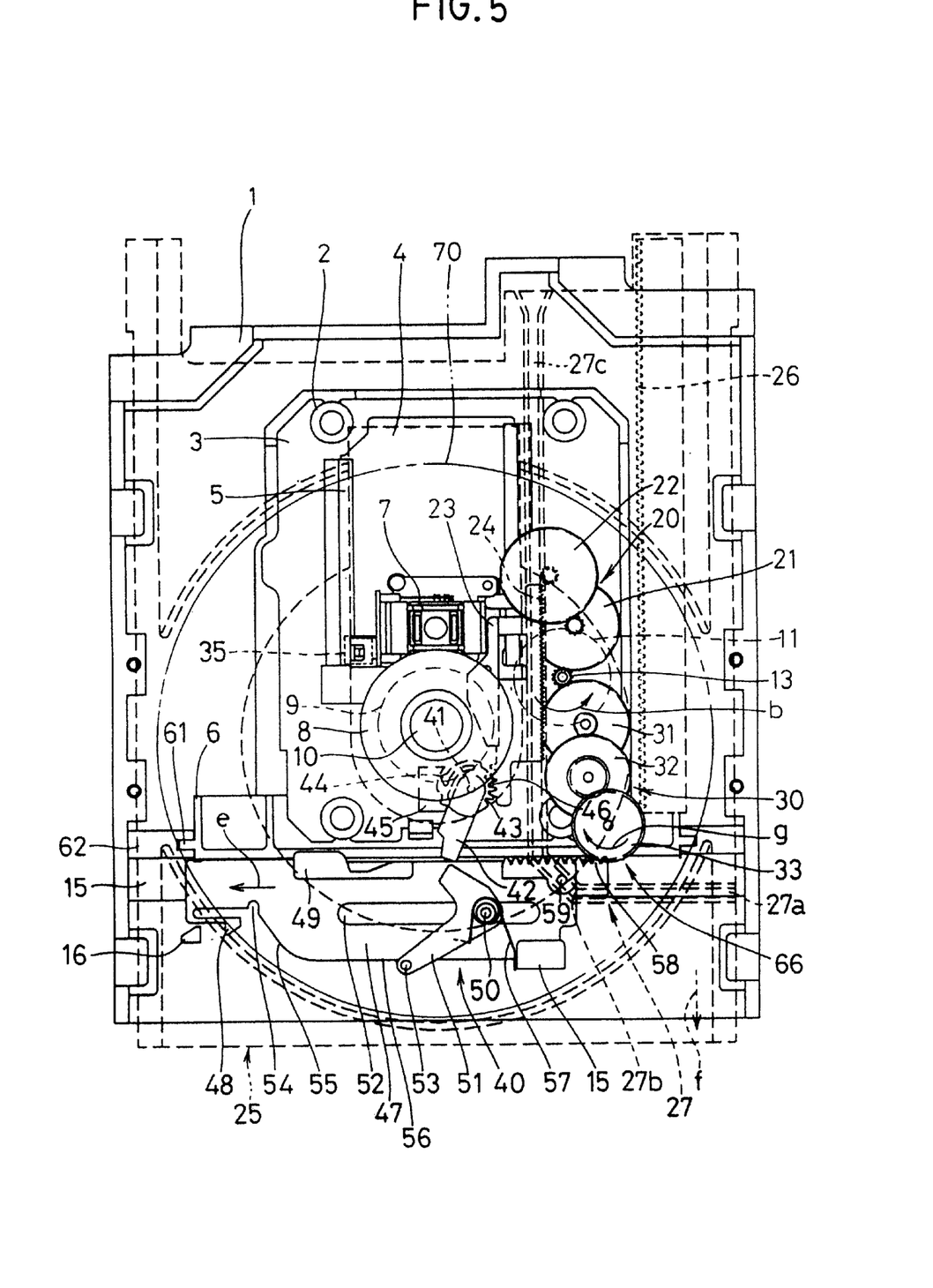
FIG. 5 is a plan view showing the optical disc device according to the embodiment of this invention, in which a cam rack has been moved to the left of the drawing and in which a loading driving gear and a tray rack start to mesh with each other.

That is, these configurations enable the optical pickup 7 to be further withdrawn toward the inner circumference, the stop lever 51 to be released, and the optical disc 70 to be unclamped from the turn table 8, by rotating (g) the fifth driving gear 33 of the loading driving means 30 so as to move the cam rack body 47 leftward (e) to the position shown in FIG. 4 from the position at which the cam rack body is located on the right side as shown in FIG. 3, FIG. 5 shows that the feed motor 11 has rotated the motor gear 13 in the counterclockwise direction (b) to cause the rotation (g) of the fifth driving gear 33 to further move (e) the cam rack body 47 leftward relative to the position shown in FIG. 4. FIG. 5 also shows as a broken line the disc tray 25, which is not shown in FIGS. 1 to 4.

When the fifth driving gear 33 further moves the cam rack body 47 leftward relative to the position shown in FIG. 4, the protruding shaft 59 on the cam rack body 47 moves leftward along the lateral groove section 27a of the cam groove 27 until it reaches the groove section 27b inclined at 45°. Then, when the protruding shaft 59 presses the left wall of the inclined groove section 27b, the disc tray 25 moves (f) frontward relative to the device body 1. At this point, the tray rack 26 provided on the disc tray 25 simultaneously moves forward and meshes with the fifth driving gear 33.

When the cam rack body 47 has moved leftward as shown in FIG. 5, the vertical slider 6 is located at the lower position and the turn table 8, that is, the traverse base 3 has swung in such a way that its front is inclined downward, thereby inclining the fifth driving gear 33 relative to its horizontal position, as shown in FIGS. 8 and 11. Since, however, the rack teeth of the tray rack 26 that meshes with the fifth driving gear 33 are inclined so as to have a tooth trace angle almost the same as the swing angle of the traverse base 3, the fifth driving gear 33 correctly meshes with the tray rack 26.

Figure 6:
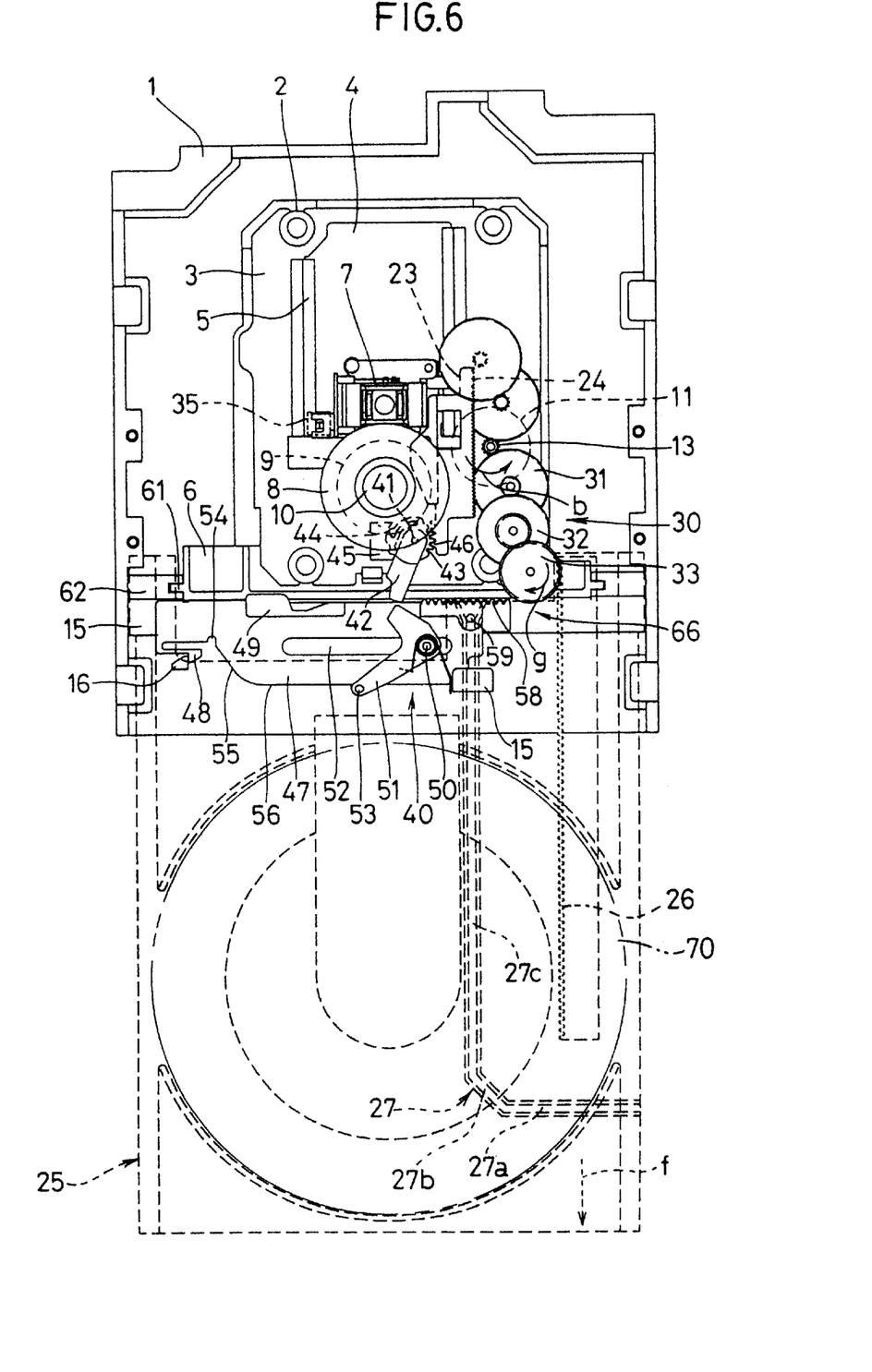
FIG. 6 is a plan view showing the optical device according to the embodiment of this invention, in which a disc tray has been ejected to the exterior of the device.

FIG. 6 shows the state in which the fifth driving gear 33 has further rotated while meshing with the tray rack 26 to eject the disc tray 25 to the exterior of the device. At this point, the protruding shaft 59 of the cam rack body 47 is located in the lateral groove section 27c of the cam groove 27 and the short rack body 58 is disengaged from the fifth driving gear 33.

As described above, by using the feed motor 11 to move the optical pickup 7, which is reproducing a signal, to the signal inner-circumferential-end switching position Z on the optical disc 70 and then continuing rotating the motor 11 without changing the rotating direction, the embodiment of this invention can automatically unclamp the optical disc 70 from the turn table 8 and eject the optical disc 70 to the exterior of the device, thereby eliminating the need for a disc loading motor required for the conventional optical disc device. As a result, the number of motors used in the device can be reduced to provide a more inexpensive optical disc device.

Although the above embodiment has been described in conjunction with the operations for unclamping and ejecting the optical disc 70 from the reproduction state, it can be applied to the transfer of the optical disc 70 to the interior of the device, the clamping of the optical disc 70, and the transfer to the reproduction state by rotating the feed motor 11 in the opposite direction, that is, the clockwise direction (a).

In addition, by using the feedmotor 11 to move the optical pickup 70 to the signal inner-most-circumferential position on the optical disc 70 so that the inner-circumference detecting switch 35 detects the position of the optical disc 7 and then changing the rotating direction of the feed motor 11 or stopping its rotation, signals from the optical disc 70 can be continuously reproduced/recorded without the need to eject the optical disc 70 to the exterior of the device.

Even without a detecting switch for detecting that the optical disc has been loaded in the device or detecting an optical-disc clamping operation, which is required for the conventional optical disc device, this embodiment can use the inner-circumference detecting switch 35 to detect these conditions to reduce the number of detecting switches required, thereby providing a more inexpensive optical disc device.

What is claimed is:

1. An optical disc device, comprising
a traverse base disposed on a device body, said traverse base including an optical pickup that records a signal on an optical disc or that reproduces a signal recorded thereon and a feed motor that displaces said optical pickup forward and backward from an inner circumferential position of an optical disc to an outer circumferential position thereof via means for driving said optical pickup, and
the device body includes loading means for transferring an optical disc from the exterior of the device body onto said traverse base and loading driving means for driving said loading means using said feed motor, said optical pickup driving means and said loading driving means being directly driven by said feed motor at different times, and
wherein the optical pickup driving means displaces the optical pickup to an extended switching position (Y) that is closer to a center of an optical disc than a signal position range (X) on such optical disc in which signals are recorded, and wherein when said optical pickup is at the extended switching position (Y), a rotational driving force of the feed motor is switched and transmitted to the loading drive means.

2. The optical disc device according to claim 1, further comprising an inner-circumference detecting switch for detecting that the optical pickup has moved to an inner-circumferential-end switching position (Z) within the signal position range due to the rotational driving force of the feed motor, and power transmission switching means for further rotationally driving the feed motor to further move the pickup toward the inner circumference of the optical disc when the inner-circumference detecting switch executes detection, thereby switching the driving force of the feed motor to the loading driving means, whereby a rotating direction of the feed motor is switched according to a detection signal from said inner-circumference detecting switch in order to selectively switch the transmission of the rotational driving force of said feed motor between the driving of the loading means and the driving of said optical pickup.

3. An optical disc device comprising a traverse base disposed on a device body, said traverse base including an optical pickup that records a signal on an optical disc or that reproduces a signal recorded thereon and a feed motor that displaces said optical pickup forward and backward from an inner circumferential position of an optical disc to an outer circumferential position thereof via means for driving said optical pickup, and the device body includes loading means for transferring an optical disc from the exterior of the device body onto said traverse base and loading driving means for driving said loading means using said feed motor, said optical pickup driving means and said loading driving means being directly driven by said feed motor at different times, and wherein the traverse base includes a turn table on which the optical disc is placed, said traverse base being mounted to be able to swing around its rear end, and wherein the device further comprises elevating means for swinging said traverse base to elevate and lower the turn table relative to the optical disc and power transmission means for transmitting a rotational driving force of said feed motor to said elevating means in response to an optical-disc transfer operation performed by said loading means, whereby the turn table is elevated and lowered in response to the optical-disc transfer operation in order that the optical disc can be installed on and removed from the turn table.

4. The optical disc device according to claim 3, wherein the loading driving means includes driving gears that transmit the rotational driving force of the feed motor and a rack that is provided in part of the loading means and meshes with said driving gears, rack teeth of said rack having a tooth trace angle almost the same as a rotational-movement angle of the traverse base.

* * * * *